(12) United States Patent
Liu et al.

(10) Patent No.: US 12,203,554 B2
(45) Date of Patent: Jan. 21, 2025

(54) PNEUMATIC PROPORTIONAL VALVE WITH HIGH FREQUENCY RESPONSE AND LOW POWER CONSUMPTION

(71) Applicant: Zhejiang University, Zhejiang (CN)

(72) Inventors: Shuo Liu, Zhejiang (CN); Sihao Fu, Zhejiang (CN); Jiajie Ma, Zhejiang (CN); Yong Cai, Zhejiang (CN); Yu Chen, Zhejiang (CN); Zhiyong Sun, Zhejiang (CN); Wanglin Lin, Zhejiang (CN)

(73) Assignee: Zhejiang University, Zhoushan (CN)

( * ) Notice: Subject to any disclaimer, the term of this patent is extended or adjusted under 35 U.S.C. 154(b) by 27 days.

(21) Appl. No.: 18/234,399

(22) Filed: Aug. 16, 2023

(65) Prior Publication Data
US 2024/0401707 A1    Dec. 5, 2024

(30) Foreign Application Priority Data
Jun. 5, 2023    (CN) .......................... 202310659718.0

(51) Int. Cl.
*F16K 11/06*    (2006.01)
*F16K 31/12*    (2006.01)
*H02K 26/00*    (2006.01)

(52) U.S. Cl.
CPC .............. *F16K 11/06* (2013.01); *F16K 31/12* (2013.01); *H02K 26/00* (2013.01)

(58) Field of Classification Search
CPC .......... F16K 11/06; F16K 31/12; H02K 26/00
See application file for complete search history.

(56) References Cited

U.S. PATENT DOCUMENTS

| | | | | |
|---|---|---|---|---|
| 5,679,989 | A | * | 10/1997 | Buscher ................. H02K 26/00 310/181 |
| 2015/0270748 | A1 | * | 9/2015 | de la Chevasnerie ....................... F15B 13/0436 310/154.11 |
| 2019/0237231 | A1 | * | 8/2019 | Sawicki .............. F16K 31/0679 |
| 2021/0138620 | A1 | * | 5/2021 | Margol ................... B25B 13/16 |
| 2022/0057826 | A1 | * | 2/2022 | Lawniczak .............. G05G 5/03 |

* cited by examiner

*Primary Examiner* — P. Macade Nichols (57) ABSTRACT

A pneumatic proportional valve includes a torque motor and a pneumatic rotary valve. The torque motor includes permanent magnets, magnetically permeable yokes, an upper armature, a lower armature, an upper skeleton, a skeleton column, a lower skeleton, an exciting coil, a coil skeleton, a spring support, a spring plate and load springs. The torque motor has a single coil structure with an axis of the exciting coil coinciding with a rotation axis of the armatures, and the coil is arranged between the upper armature and the lower armature. The torque motor has the upper armature and the lower armature, and the upper armature and the lower armature have a total of four armature arms, which can form eight air gaps with an upper one and a lower one working in pair, form four pairs of magnetic circuits in parallel with each other under the excitation of a control coil.

11 Claims, 8 Drawing Sheets

PNEUMATIC PROPORTIONAL VALVE WITH HIGH FREQUENCY RESPONSE AND LOW POWER CONSUMPTION

CROSS REFERENCE TO RELATED APPLICATIONS

The present application claims the benefit of Chinese Patent Application No. 202310659718.0 filed on Jun. 5, 2023, the contents of which are incorporated herein by reference in their entirety.

TECHNICAL FIELD

The present disclosure relates to the technical field of design of valve bodies, and in particular, to a rotary pneumatic proportional directional valve with high frequency response and low power consumption.

BACKGROUND

A proportional valve is a very important control element of a fluid system, and its performance affects the control accuracy and rapidity of the system. Most of the traditional pneumatic proportional valves adopt the structural form of a proportional electromagnet with a seat valve. However, due to the large translational inertia, the proportional electromagnet is often low in response speed and frequency response. Moreover, since the magnetic field is generated entirely by the coil, the power consumption is also high. The form of a torque motor with a rotary valve can give full play to the advantage of small rotary inertia of moving parts, thus improving the response speed.

However, for a traditional torque motor, its structure is not compact enough, and the axis of the control coil points to the length direction of the armature; and there are two coils, so it is required to leave space for the coil at the armature arm, making it difficult to further reduce the rotary inertia, which hinders the further increase of the frequency response. Besides, the traditional torque motor often has a small output torque, and thus a large volume and high power consumption in order to meet the needs of the control valve. Nowadays, the volume and power consumption of the pneumatic valve are decreasing and the frequency response is increasing, so it is difficult for the traditional torque motor to meet the performance requirements of a direct-drive pneumatic proportional valve.

SUMMARY

The present disclosure provides a pneumatic proportional valve with high frequency response and low power consumption, which has the advantages of simple and compact structure, small inertia of motion and large output torque, includes a torque motor driven by a single coil and is directly driven by the torque motor.

The pneumatic proportional valve of the present disclosure includes a torque motor and a pneumatic rotary valve.

The torque motor has a single coil structure and includes permanent magnets, magnetically permeable yokes, an upper armature, a lower armature, an upper skeleton, a skeleton column, a lower skeleton, an exciting coil, a coil skeleton, a spring support, a spring plate and load springs.

The upper skeleton and the lower skeleton are respectively provided with a blind hole, and two ends of the skeleton column are respectively inserted into the blind holes of the upper skeleton and the lower skeleton. The exciting coil is wound on the coil skeleton, and the skeleton column runs through a through hole in the middle of the coil skeleton and is sandwiched between the upper skeleton and the lower skeleton.

The upper armature includes armature arms and a magnetically permeable column in the middle. The magnetically permeable column runs through a through hole in the middle of the skeleton column, and the armature arms are arranged in a groove of the upper skeleton. The lower armature is arranged in a groove of the lower skeleton and connected to a lower end of the magnetically permeable column of the upper armature through an interference fit, and the lower end of the magnetically permeable column is also connected to the lower skeleton through a first bearing.

The four magnetically permeable yokes are attached to a periphery of the exciting coil.

Each of the magnetically permeable yokes is in a shape of a cylindrical sector as a whole, and two side surfaces perpendicular to each other are closely attached to outer wall surfaces of the grooves of the upper skeleton and the lower skeleton respectively. The four permanent magnets are respectively sandwiched among the four magnetically permeable yokes. The armature arms of the upper armature and the armature arms of the lower armature are vertically staggered up and down, and form eight working air gaps with the four magnetically permeable yokes.

The spring support is mounted on an upper end surface of the upper skeleton. A second bearing is provided on the spring support and configured to support an upper end of the magnetically permeable column, and a middle of the spring plate is provided with a semi-circular through hole that is fitted with a semi-circular shaft on the upper end of the magnetically permeable column and fixed by means of a stop screw.

The four load springs are respectively arranged on a periphery of the spring plate, and an amount of compression of the load springs on two ends of the spring plate is adjusted, thereby adjusting an initial rotation angle of the armatures.

The pneumatic rotary valve includes a valve body, a valve sleeve, a valve core, a wedge, an air valve connecting piece and pneumatic connectors.

The valve body and the valve sleeve are in an interference fit, and the valve core and the valve sleeve are in a clearance seal and connected through a bearing pack.

A middle of the valve core is provided with a semi-circular straight through hole and a threaded blind hole, and the wedge is arranged in the blind hole of the valve core. A flat side surface of the wedge is closely attached to a flat side surface of the semi-circular straight through hole of the valve core, and an inclined side surface of the wedge is closely attached to an inclined surface on the lower end of the magnetically permeable column. Transmission between the torque motor and the valve core is realized by means of the inclined surface and the flat side surface of the wedge.

A flow channel in the valve body is aligned with and attached to a flow channel in the air valve connecting piece. Threaded ends of the pneumatic connectors are screwed into four threaded holes of the air valve connecting piece, and quick plug ends are connected to a pneumatic system to be controlled.

The present disclosure has the following beneficial effects:

The torque motor in the present disclosure has a single coil structure with an axis of the exciting coil coinciding with a rotation axis of the armatures, and the coil is arranged between the upper armature and the lower armature. Therefore, the structure is simple and compact, and it is easy to realize miniaturization of the torque motor.

In the present disclosure, there is no need to leave space for the coil at the armature arm of the torque motor, which can reduce the radial dimension of the armature arm and the rotary inertia, making it easy to realize high frequency response.

In the present disclosure, the torque motor has the upper armature and the lower armature, and the upper armature and the lower armature have a total of four armature arms, which can form eight air gaps. The eight air gaps, with an upper one and a lower one working in pair, form four pairs of magnetic circuits in parallel with each other under the excitation of the control coil. In a case of the same power consumption and size, compared with the traditional structure with one armature, the torque motor with two pairs of magnetic circuits in parallel has a larger output torque, and thus can realize the same output torque with lower power consumption and smaller size.

The valve part of the proportional directional valve is in a structural form of a rotary valve which has a compact internal structure, so it is easy to reduce the inertia and realize high response speed. There is no need for an eccentric mechanism between the torque motor and the rotary valve, which makes the structure simpler. In the whole proportional directional valve, kinematic pair is a revolute pair, and moving parts are supported by bearings, making the output hysteresis of the valve smaller.

DETAILED DESCRIPTION

Specific implementations of the present disclosure will be further described in detail below in conjunction with the accompanying drawings.

As shown in FIG. 1, FIG. 3, FIG. 4 and FIG. 5, this application provides a rotary pneumatic proportional directional valve, which is divided into a torque motor and a pneumatic rotary valve. The torque motor has a novel single coil structure and includes permanent magnets 10, magnetically permeable yokes 9, an upper armature 6, a lower armature 7, an upper skeleton 1, a skeleton column 3, a lower skeleton 2, an exciting coil 4, a coil skeleton 5, a first bearing 8, a second bearing 12, a spring support 11, a spring plate 13, load springs 15, a stop screw 14, an adjusting plate 16, adjusting screws 17 and a housing 18.

The upper skeleton and the lower skeleton are respectively provided with a blind hole, and two ends of the skeleton column are respectively inserted into the blind holes of the upper skeleton and the lower skeleton. The coil is wound on the coil skeleton. The skeleton column runs through a through hole in the middle of the coil skeleton and is sandwiched between the upper skeleton and the lower skeleton.

In a certain example, the skeleton column is also provided with a sealing groove at each of positions near the two ends, and the sealing grooves are used for placing sealing rings.

Figure 6:
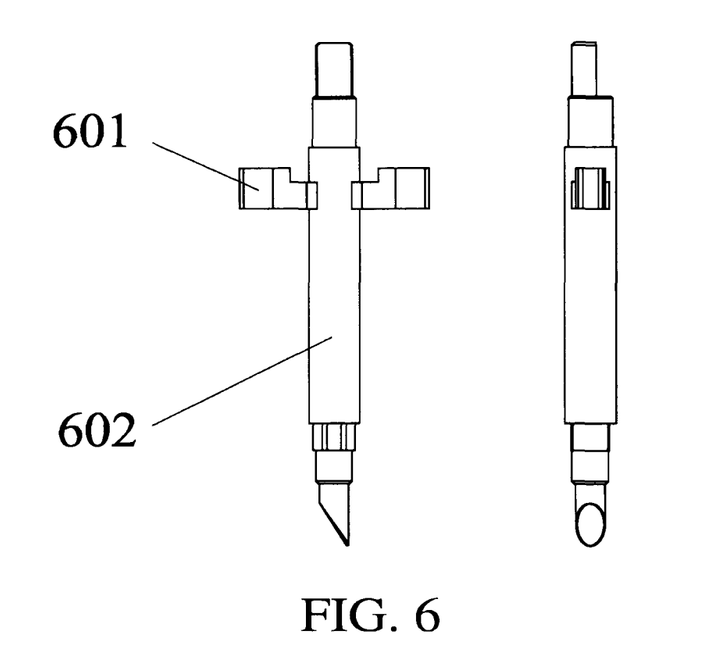
FIG. 6 shows the structure of the upper armature of the novel single coil torque motor of the present disclosure.

As shown in FIG. 6, the upper armature has a T-shaped structure and includes armature arms 601 and a magnetically permeable column 602 in the middle. The magnetically permeable column runs through a through hole in the middle of the skeleton column. The armature arms are placed in a groove of the upper skeleton. The structure of the lower armature is similar to the armature arms of the upper armature. The lower armature is arranged in a groove of the lower skeleton and connected to a lower end of the magnetically permeable column of the upper armature through an interference fit, and the lower end of the magnetically permeable column is also connected to and supported together with the lower skeleton through a first bearing.

Figure 8:
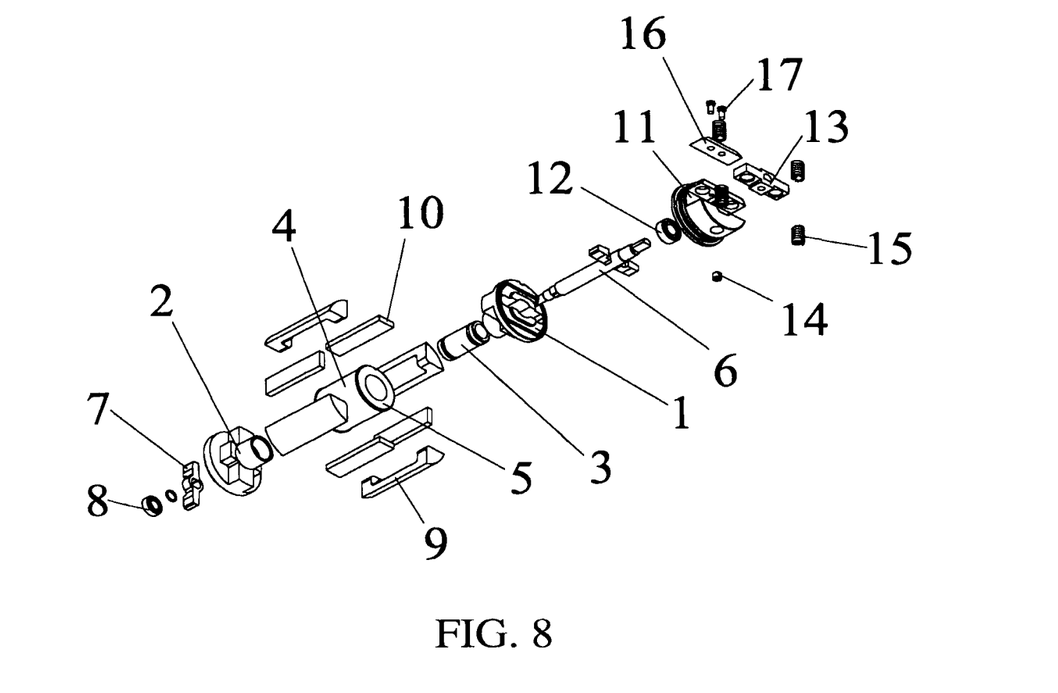
FIG. 8 shows a schematic exploded view of the novel single coil torque motor of the present disclosure.

As shown in FIG. 8, the magnetically permeable yoke is in a shape of a cylindrical sector as a whole. The four magnetically permeable yokes are attached to a periphery of the exciting coil, and two side surfaces perpendicular to each other are closely attached to outer wall surfaces of the grooves of the upper skeleton and the lower skeleton respectively. The four permanent magnets are respectively sandwiched among the four magnetically permeable yokes. The spring support is mounted on an upper end surface of the upper skeleton. A second bearing is provided on the spring support and configured to support an upper end of the magnetically permeable column of the upper armature. A middle of the spring plate is provided with a semi-circular through hole that is fitted with a semi-circular hole on the upper end of the magnetically permeable column of the upper armature and fixed by means of a stop screw. The four springs are respectively arranged on a periphery of the spring plate, and an amount of compression of the springs on two ends of the spring plate is adjusted by means of the adjusting plate and the adjusting screws, thereby adjusting an initial rotation angle of the armatures.

In a certain example, the spring support is mounted on the upper end surface of the upper skeleton and has a square straight opening for positioning. The upper end surface of the upper skeleton is further provided with a sealing groove for placing a sealing ring to realize sealing between the upper skeleton and the spring support.

The whole assembly of the torque motor is placed in a housing. Sealing between the housing and the torque motor is realized by the sealing ring mounted on the side surface of the spring support. The housing and the upper skeleton are provided with a wire outlet hole and a wire outlet slot. A wire of the exciting coil is led out from the wire outlet hole and the wire outlet slot.

Figure 1:
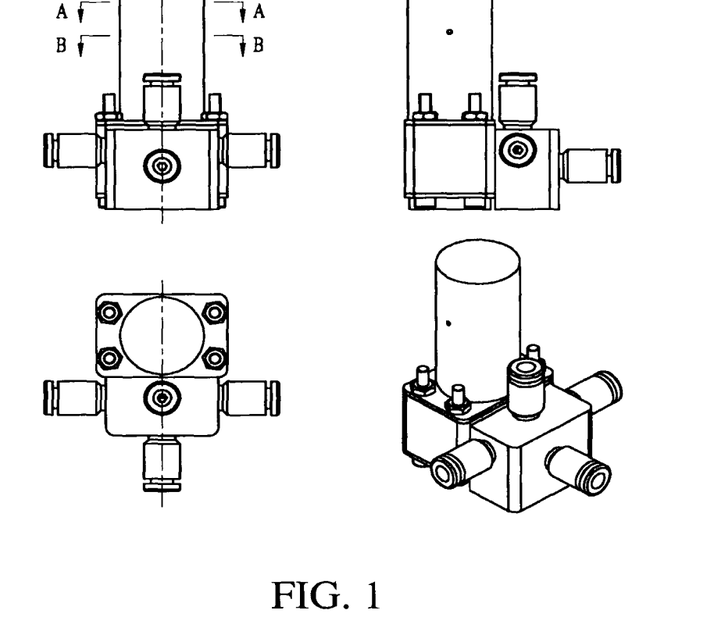
FIG. 1 shows three views of the present disclosure.
Figure 2:
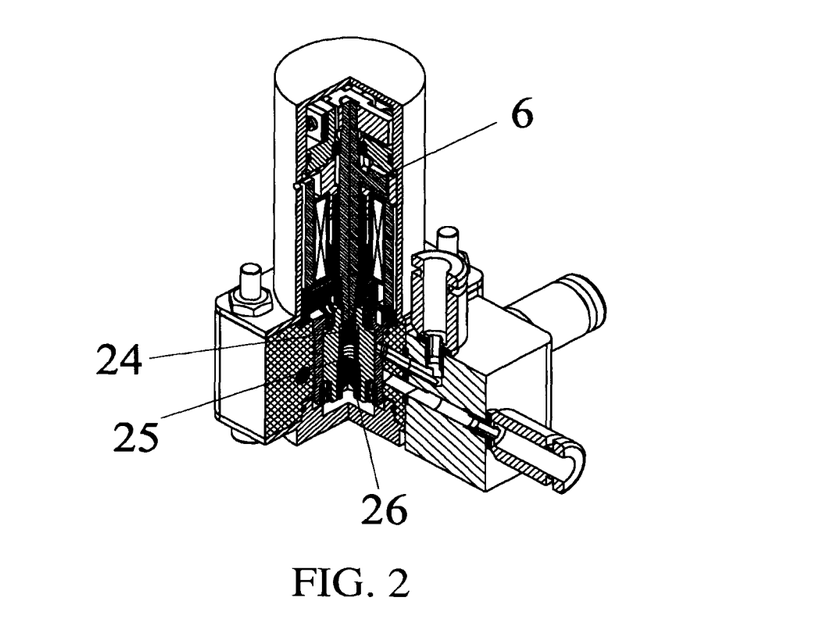
FIG. 2 shows a one-quarter sectional view of the present disclosure.
Figure 3:
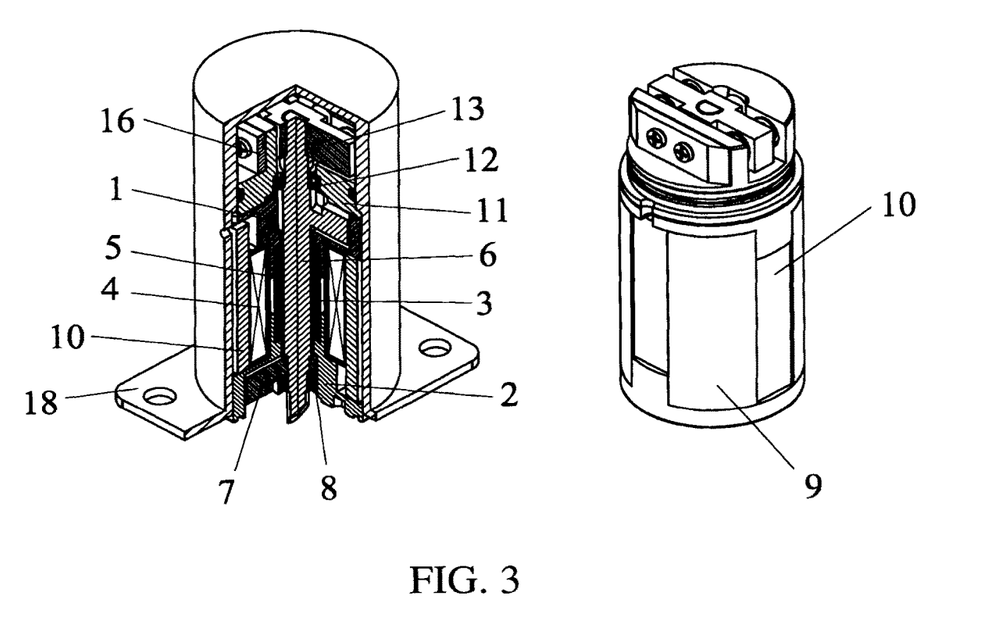
FIG. 3 shows a one-quarter sectional view and a side view with a housing removed of a novel single coil torque motor of the present disclosure.
Figure 4:
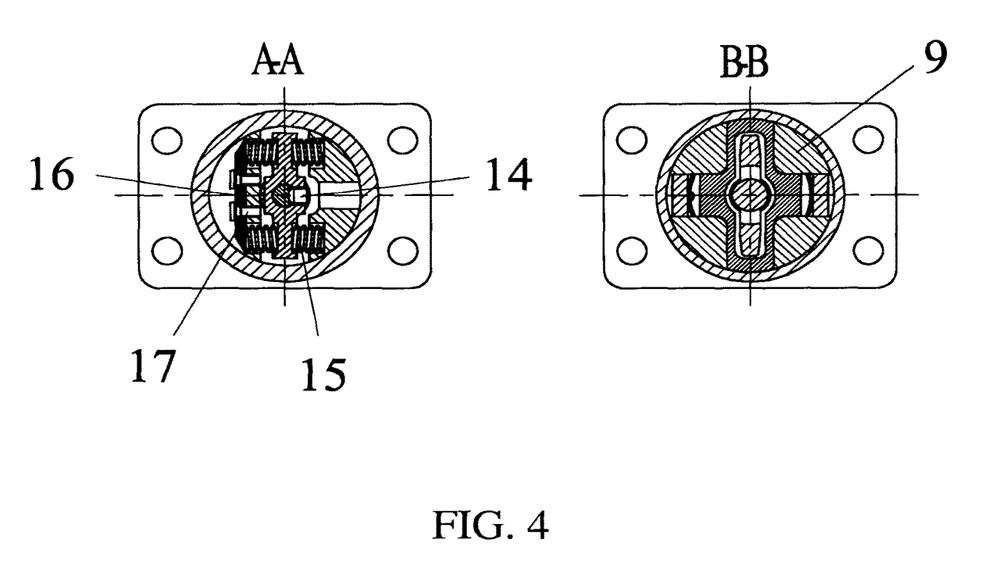
FIG. 4 shows sectional views of FIG. 1 along line A-A and line B-B according to the present disclosure.
Figure 5:
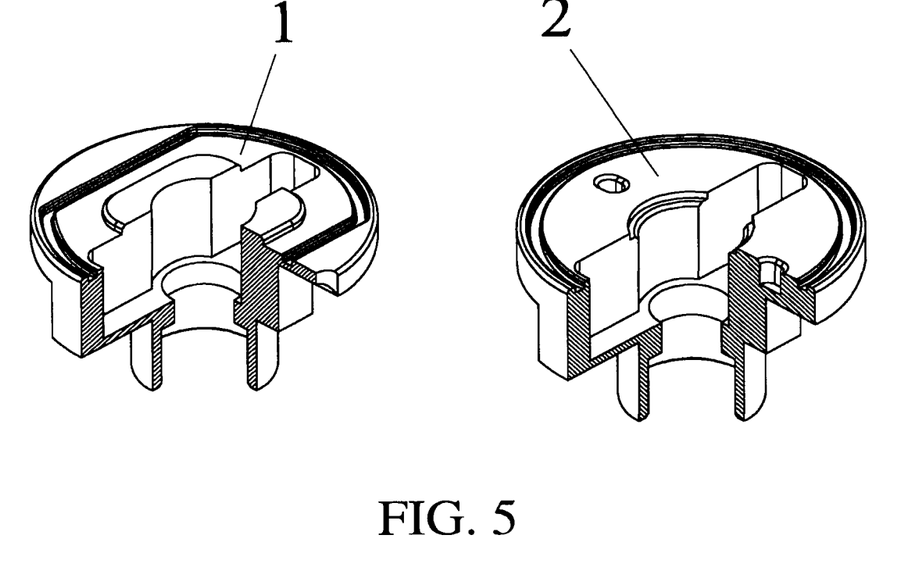
FIG. 5 shows one-quarter sectional views of an upper skeleton and a lower skeleton of the novel single coil torque motor of the present disclosure.
Figure 7:
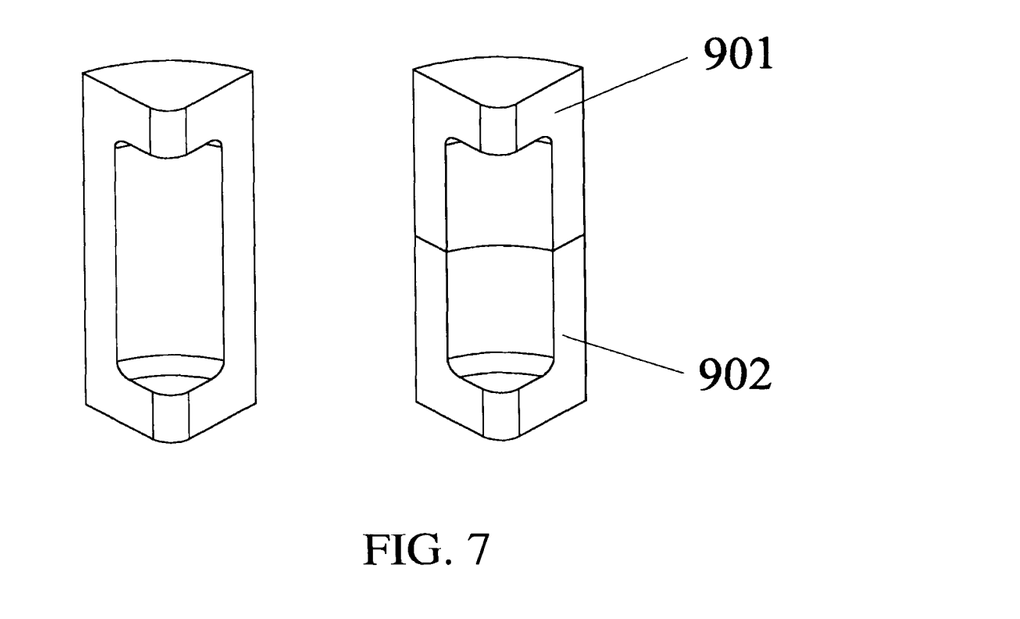
FIG. 7 shows the structure of a magnetically permeable yoke of the novel single coil torque motor of the present disclosure.
Figure 9:
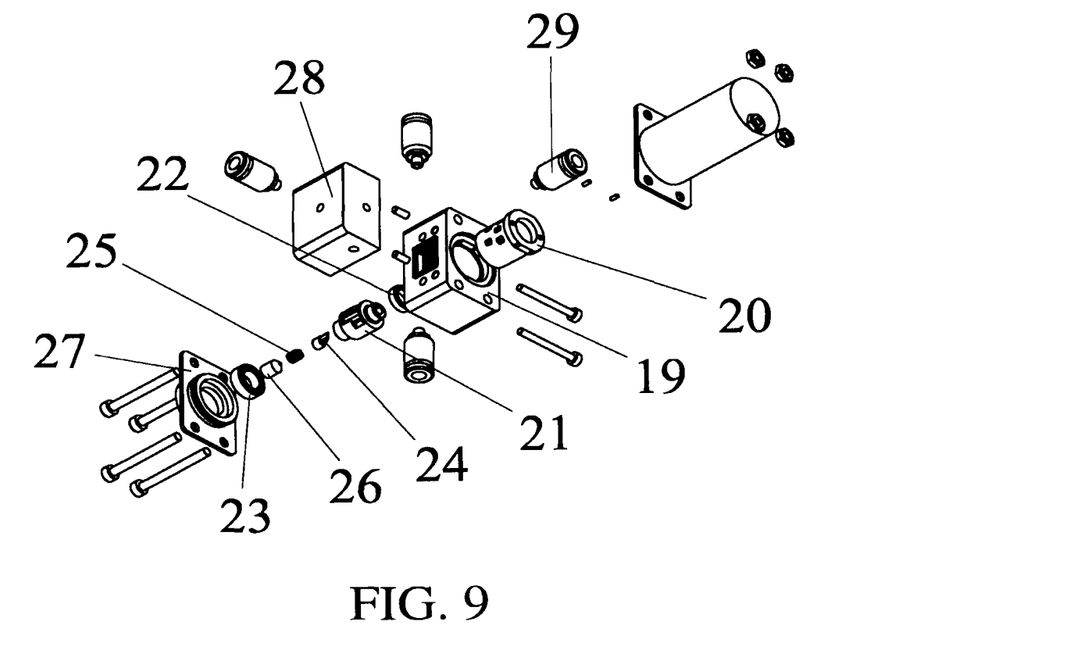
FIG. 9 shows a schematic exploded view of a rotary valve of the present disclosure.
Figure 10:
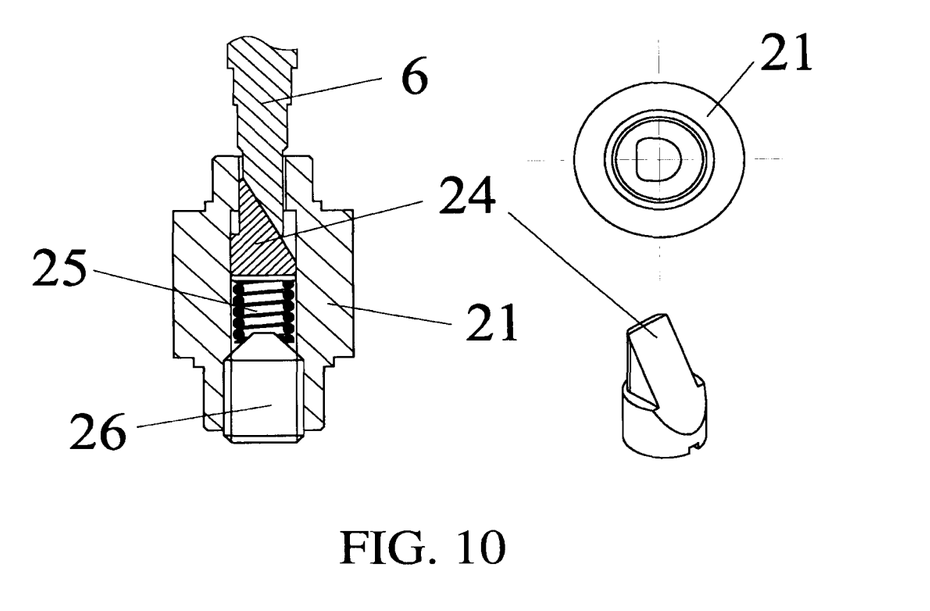
FIG. 10 shows a transmission mode between the torque motor and a valve core of the present disclosure.

As shown in FIG. 2, FIG. 9 and FIG. 10, the pneumatic rotary valve includes a valve body 19, a valve sleeve 20, a valve core 21, a third bearing 22, a fourth bearing 23, a wedge 24, a support spring 25, a set screw 26, an end cover 27, an air valve connecting piece 28 and pneumatic connectors 29. The valve body and the valve sleeve are in an interference fit. The valve core and the valve sleeve are in a clearance seal and connected through the third bearing and the fourth bearing. A middle of the valve core is provided with a semi-circular straight through hole and a threaded blind hole. The wedge is arranged in the blind hole of the valve core. A flat side surface of the wedge is closely attached to a flat side surface of the semi-circular straight through hole. An inclined surface of the wedge is closely attached to an inclined surface on the lower end of the magnetically permeable column of the upper armature of the torque motor. The lower skeleton of the torque motor and the valve sleeve are positioned by means of a positioning pin. Transmission between the torque motor and the valve core is realized by means of the inclined surface and the flat side surface of the wedge. The spring is placed in the blind hole of the valve core, and the set screw is screwed into the blind hole of the valve core to abut against the wedge. Considering the machinability of the magnetically permeable yoke, the magnetically permeable yoke can be divided into an upper magnetically permeable yoke 901 and a lower magnetically permeable yoke 902 which are the same, as shown in FIG. 7.

The end cover is mounted on a lower end of the valve body. A side surface of a boss on the end cover is provided with a sealing groove. The boss abuts against the third bearing on a lower end of the valve core and realizes a sealing function together with the valve body. A flow channel in the valve body is aligned with and attached to a flow channel in the air valve connecting piece. The flow channels are sealed by the sealing ring and fastened by a screw. Threaded ends of the pneumatic connectors are screwed into four threaded holes of the air valve connecting piece. Quick plug ends are connected to a pneumatic system to be controlled.

In a certain example, a lower end surface of the lower skeleton is also provided with a sealing groove. By means of bolted connection between the housing and the valve body, the sealing ring in the sealing groove is fastened, thereby realizing sealing.

As a preferred solution, in a certain example, the armature arms of the upper armature and the armature arms of the lower armature of the torque motor are vertically staggered up and down, and form 8 working air gaps with the four magnetically permeable yokes.

As a preferred solution, in a certain example, the four permanent magnets of the torque motor are made of a neodymium-iron-boron material. Adjacent sides of every two adjacent permanent magnets have a same polarity.

As a preferred solution, in a certain example, the upper armature, the lower armature and the magnetically permeable yokes of the torque motor are made of a magnetically permeable material DT4C.

As a preferred solution, in a certain example, the valve body of the pneumatic rotary valve is made of plastics with smaller rigidity, and the valve sleeve is made of stainless steel with larger rigidity.

Figure 12:
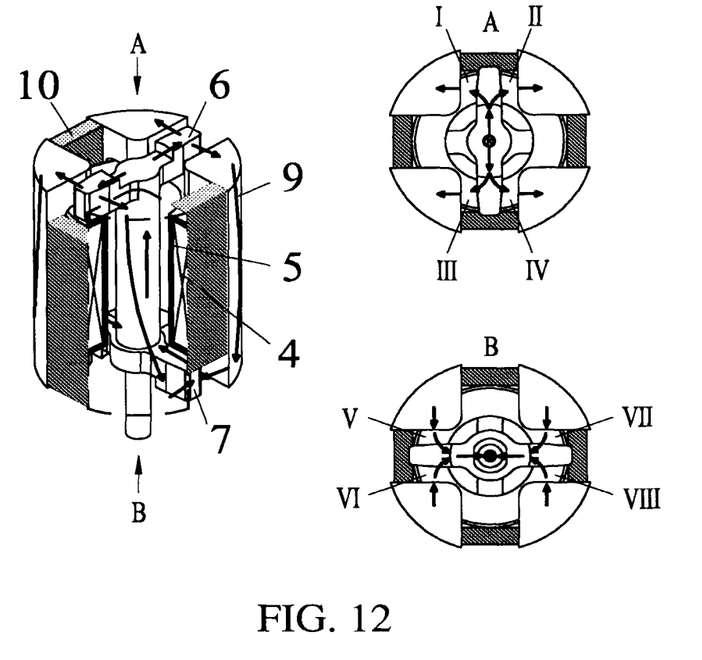
FIG. 12 shows schematic views of magnetic circuits generated by an exciting coil of the novel single coil torque motor of the present disclosure.

In the present disclosure, the novel single coil torque motor has different magnetic circuits from the traditional torque motor. The flux generated by the coil goes up along the magnetically permeable column of the upper armature, and when reaching the upper end of the magnetically permeable column, it is divided into two branches that respectively go along the armature arms on the two sides. When the branch flux goes to the end of the armature arm, it is also divided into two branches that respectively run through the two side surfaces of the armature arms and enter the magnetically permeable yokes on the two sides. Then, the four branch magnetic circuits on the two ends of the armature arms of the upper armature respectively enter the lower armature from four side surfaces on the two ends of the armature arms of the lower armature along the four magnetically permeable yokes, and finally return to the magnetically permeable column of the upper armature along the lower armature, thereby forming a closed loop, as shown in FIG. 12.

Figure 11:
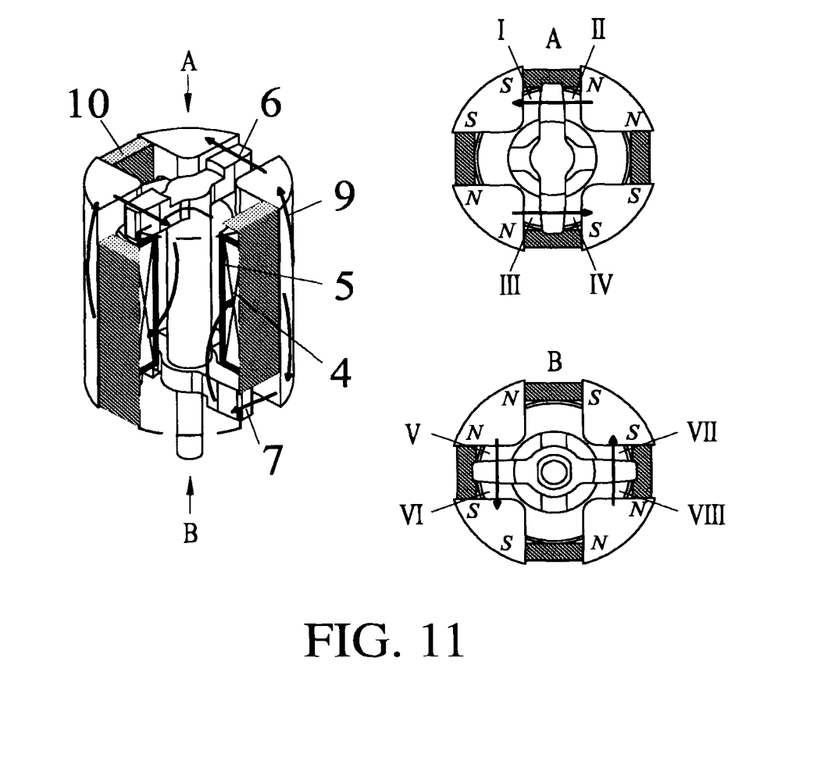
FIG. 11 shows schematic views of magnetic circuits generated by permanent magnets of the novel single coil torque motor of the present disclosure.

Since adjacent end surfaces of two adjacent permanent magnets have the same magnetic poles, by means of the magnetically permeable yokes, fluxes generated by them respectively go up and down, sequentially run through the working air gaps on the two sides of the armature arms and return to their respective other poles, as shown in FIG. 11. Therefore, the fluxes generated by the exciting coil at the working air gaps on the two sides of the armature arms are in opposite directions, and the fluxes generated by the permanent magnets are in the same direction. As a result, the fluxes generated by the coil and the fluxes generated by the permanent magnets are superimposed on each other at the working air gaps on one side, and cancel each other at the working air gaps on the other side, thereby generating a flux difference, so that the end of the armature arm is subjected to the electromagnetic force pointing to the side with the larger flux. While the four armature arms are subjected to the electromagnetic forces toward the same direction, the electromagnetic torque that makes the armature rotate toward the specified direction is generated.

Based on the design of the magnetic circuits described above, the axis of the exciting coil does not need to be arranged in the length direction of the armature arms, and the armature arms can be arranged on the upper and lower ends of the exciting coil, so that the axis of the coil can coincide with the axis of the rotating shaft, which makes the overall structure more compact. Moreover, there may be two armatures arranged to increase the output torque. The upper and lower armatures are vertically staggered up and down, and the permanent magnets in the present disclosure are arranged in such a way that the electromagnetic forces of the four armature arms of the torque motor based on the magnetic circuits point to the same direction. In this way, the torque motor can output the torque and support the feasibility of the magnetic circuit solution.

The working principle of the rotary pneumatic proportional directional valve of the present disclosure is as follows:

When the exciting coil is not energized, the armatures are in the middle position of the working air gaps under the action of the spring mechanism, and the valve core of the rotary valve is also in the middle position. Port P and port T are closed, and there is no gas flowing through Port A and Port B. The structure of the spring mechanism is shown as the A-A view in FIG. 4. As this time, only the bias flux generated by the permanent magnets is present in the magnetically permeable parts of the torque motor, and the magnetic circuit is shown in FIG. 11. When a forward current is introduced into the exciting coil, a control flux appears in the magnetically permeable parts of the torque motor, as shown in FIG. 12. The control flux and the bias flux are combined into a total flux at the working air gaps and generate an electromagnetic force that drives the upper and lower armatures to rotate counterclockwise. Since the novel single coil torque motor has eight working air gaps I, II, III, IV, V, VI, VII and VIII, it has a larger output torque than the traditional torque motor under the same current. Under the transmission of the wedge, the springs and the set screw, the valve core also rotates, and finally the electromagnetic torque is balanced with the load torque of the spring mechanism and the valve core is in the working state (1) in FIG. 13. At this time, in the air valve, Port P is in communication with Port A, and Port B is in communication with Port T. High-pressure gas at the inlet enters the air valve from Port P, leaves the air valve from Port A, and enters the controlled pneumatic system, thereby driving the pneumatic actuator to work. Then, the gas flows out from the outlet of the actuator, enters the air valve from Port B, finally leaves the air valve from Port T, and returns to the air cavity or is discharged to the atmosphere. By adjusting the size of the current input into the torque motor, the flow rate of gas flowing through Port A and Port B can be adjusted, thereby adjusting the movement velocity of the pneumatic actuator.

Figure 13:
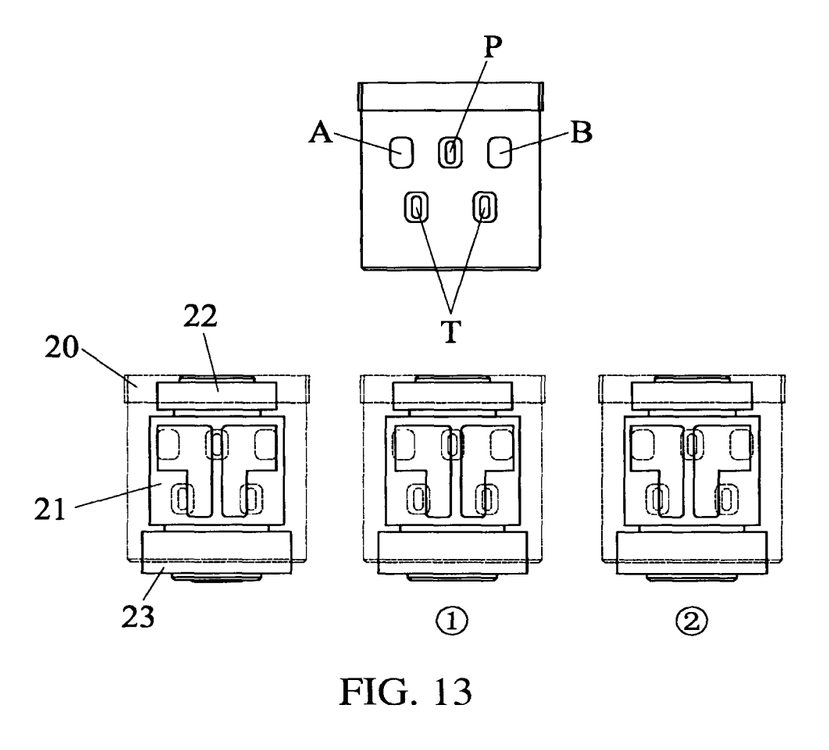
FIG. 13 shows the working principle of the rotary valve of the rotary pneumatic proportional directional valve of the present disclosure.

When a reverse current is introduced into the exciting coil, similarly, a reverse control flux is generated in the torque motor and combined with the flux of the permanent magnets to generate a total flux, which generates a reverse driving torque to drive the armatures to move clockwise, thereby driving the valve core to be in the working state (2) in FIG. 13. At this time, the gas at the inlet enters from Port P, leaves the air valve from Port B, and drives the pneumatic actuator to return to the original state. Then, the gas flows out from the outlet of the actuator, enters the air valve from Port A, finally leaves the air valve from Port T, and returns to the air cavity or is discharged to the atmosphere. Similarly, the flow rate can be adjusted by adjusting the size of the current.

Based on the above, starting from the aspect of innovating the structure and magnetic circuits of the torque motor, by improving the compactness and output torque of the torque motor and adopting the method in which the torque motor directly drives the rotary valve, there is no need for the eccentric mechanism, so that the structure is simple, thereby achieving the goals of miniaturization and low power consumption of the pneumatic proportional directional valve. Compared with the slide valve structure commonly used in the traditional directional valve, the rotary valve has a simple and compact interior and small rotary inertia, making it easy to realize quick response.

Finally, it should be noted that the above description is only a specific example of the present disclosure. Apparently, the present disclosure is not limited to the above examples, and there may be many variations. All variations that can be directly derived or figured out from the contents of the present disclosure by those of ordinary skill in the art shall be considered as the scope of protection of the present disclosure.

What is claimed is:

1. A pneumatic proportional valve with high frequency response and low power consumption, comprising a torque motor and a pneumatic rotary valve; wherein the torque motor has a single coil structure and comprises permanent magnets, magnetically permeable yokes, an upper armature, a lower armature, an upper skeleton, a skeleton column, a lower skeleton, an exciting coil, a coil skeleton, a spring support, a spring plate and load springs;

the upper skeleton and the lower skeleton are respectively provided with a blind hole, and two ends of the skeleton column are respectively inserted into the blind holes of the upper skeleton and the lower skeleton; the exciting coil is wound on the coil skeleton, and the skeleton column runs through a through hole in the middle of the coil skeleton and is sandwiched between the upper skeleton and the lower skeleton;

the upper armature comprises armature arms and a magnetically permeable column in the middle, the magnetically permeable column running through a through hole in the middle of the skeleton column, and the armature arms being arranged in a groove of the upper skeleton; the lower armature is arranged in a groove of the lower skeleton and connected to a lower end of the magnetically permeable column of the upper armature through an interference fit, and the lower end of the magnetically permeable column is also connected to the lower skeleton through a first bearing;

four magnetically permeable yokes are attached to a periphery of the exciting coil, each of the magnetically permeable yokes being in a shape of a cylindrical sector as a whole, and two side surfaces perpendicular to each other being closely attached to outer wall surfaces of the grooves of the upper skeleton and the lower skeleton respectively; four permanent magnets are respectively sandwiched among the four magnetically permeable yokes; the armature arms of the upper armature and the armature arms of the lower armature are vertically staggered up and down, and form eight working air gaps with the four magnetically permeable yokes;

the spring support is mounted on an upper end surface of the upper skeleton, a second bearing is provided on the spring support and configured to support an upper end of the magnetically permeable column, and a middle of the spring plate is provided with a semi-circular through hole that is fitted with a semi-circular shaft on the upper end of the magnetically permeable column and fixed by means of a stop screw;

four load springs are respectively arranged on a periphery of the spring plate, and an amount of compression of the load springs on two ends of the spring plate is adjusted, thereby adjusting an initial rotation angle of the armatures;

the pneumatic rotary valve comprises a valve body, a valve sleeve, a valve core, a wedge, an air valve connecting piece and pneumatic connectors;

the valve body and the valve sleeve are in an interference fit, and the valve core and the valve sleeve are in a clearance seal and connected through a bearing pack;

a middle of the valve core is provided with a semi-circular straight through hole and a threaded blind hole, and the wedge is arranged in the blind hole of the valve core, a flat side surface of the wedge being closely attached to a flat side surface of the semi-circular straight through hole of the valve core, and an inclined side surface of the wedge being closely attached to an inclined surface on the lower end of the magnetically permeable column; transmission between the torque motor and the valve core is realized by means of the inclined surface and the flat side surface of the wedge; and a flow channel in the valve body is aligned with and attached to a flow channel in the air valve connecting piece, threaded ends of the pneumatic connectors are screwed into four threaded holes of the air valve connecting piece, and quick plug ends are connected to a pneumatic system to be controlled.

2. The pneumatic proportional valve according to claim 1, further comprising an adjusting plate and adjusting screws, wherein the amount of compression of the load springs on the two ends of the spring plate is adjusted by means of the adjusting plate and the adjusting screws.

3. The pneumatic proportional valve according to claim 1, wherein the lower skeleton and the valve sleeve are positioned by means of a positioning pin.

4. The pneumatic proportional valve according to claim 1, wherein the four permanent magnets are made of a neodymium-iron-boron material, and adjacent sides of every two adjacent permanent magnets have a same polarity.

5. The pneumatic proportional valve according to claim 4, wherein the upper armature, the lower armature and the magnetically permeable yokes are made of a magnetically permeable material DT4C.

6. The pneumatic proportional valve according to claim 2, wherein the four permanent magnets are made of a neodymium-iron-boron material, and adjacent sides of every two adjacent permanent magnets have a same polarity.

7. The pneumatic proportional valve according to claim 6, wherein the upper armature, the lower armature and the magnetically permeable yokes are made of a magnetically permeable material DT4C.

8. The pneumatic proportional valve according to claim 3, wherein the four permanent magnets are made of a neodymium-iron-boron material, and adjacent sides of every two adjacent permanent magnets have a same polarity.

9. The pneumatic proportional valve according to claim 8, wherein the upper armature, the lower armature and the magnetically permeable yokes are made of a magnetically permeable material DT4C.

10. The pneumatic proportional valve according to claim 1, wherein a support spring and a set screw are further arranged in the blind hole of the valve core and configured to abut against the wedge.

11. The pneumatic proportional valve according to claim 1, wherein an end cover is mounted on a lower end of the valve body, a side surface of a boss on the end cover is provided with a sealing groove, and the boss abuts against a bearing on a lower end of the valve core and realizes a sealing function together with the valve body.

* * * * *